(12) United States Patent
Dewey et al.

(10) Patent No.: US 10,337,607 B2
(45) Date of Patent: Jul. 2, 2019

(54) SELECTIVELY CONTROLLABLE FILTRATION SYSTEM OF A TRANSMISSION AND METHOD THEREOF

(71) Applicant: Allison Transmission, Inc., Indianapolis, IN (US)

(72) Inventors: Lawrence E. Dewey, Indianapolis, IN (US); Randall R. Kirk, Indianapolis, IN (US); Charles F. Long, Zionsville, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 894 days.

(21) Appl. No.: 14/869,175

(22) Filed: Sep. 29, 2015

(65) Prior Publication Data
US 2017/0089456 A1 Mar. 30, 2017

(51) Int. Cl.
| | |
|---|---|
| *F16H 61/00* | (2006.01) |
| *F16H 61/02* | (2006.01) |
| *F16H 57/04* | (2010.01) |
| *G01M 15/02* | (2006.01) |
| *F01M 11/03* | (2006.01) |

(52) U.S. Cl.
CPC ......... *F16H 61/0267* (2013.01); *F01M 11/03* (2013.01); *F16H 57/0404* (2013.01); *F16H 57/0413* (2013.01); *F16H 57/0435* (2013.01); *F16H 57/0446* (2013.01); *F16H 61/0021* (2013.01); *G01M 15/02* (2013.01); *F16H 2061/0037* (2013.01)

(58) Field of Classification Search
CPC ............. F16H 61/0267; F16H 57/0404; F16H 61/4043; F16H 57/0405

USPC .................................................. 60/453–456
See application file for complete search history.

(56) References Cited

U.S. PATENT DOCUMENTS

| | | |
|---|---|---|
| 2014/0260228 A1 | 9/2014 | Long et al. |
| 2015/0153001 A1 | 6/2015 | Craft et al. |

FOREIGN PATENT DOCUMENTS

| | | |
|---|---|---|
| EP | 2085655 B1 | 11/2011 |
| KR | 200170921 Y1 | 4/2000 |
| WO | 02085689 A1 | 10/2002 |

OTHER PUBLICATIONS

International Search Report & Written Opinion, Korean Intellectual Property Office, dated Jun. 13, 2016, pp. 1-20.

*Primary Examiner* — F Daniel Lopez
*Assistant Examiner* — Daniel S Collins
(74) *Attorney, Agent, or Firm* — Taft Stettinius & Hollister LLP; Stephen F. Rost (57) ABSTRACT

A hydraulic system of a transmission includes a controller, a pump, a fluid circuit fluidly coupled to the pump, a pressure regulator for regulating pressure in the fluid circuit, a cooler circuit fluidly coupled to the pressure regulator, a filter disposed in the fluid circuit downstream from the cooler circuit, and a bypass circuit disposed in the fluid circuit and fluidly coupled to the pressure regulator. The bypass circuit includes a valve movable between an open position and a closed position. In the open position, a first portion of fluid flowing from the pressure regulator flows through the bypass circuit and a second portion of the fluid flows through the cooler circuit and filter. In the closed position, the fluid flowing from the pressure regulator only flows through the cooler circuit and filter.

31 Claims, 5 Drawing Sheets

SELECTIVELY CONTROLLABLE FILTRATION SYSTEM OF A TRANSMISSION AND METHOD THEREOF

FIELD OF THE DISCLOSURE

The present disclosure relates to a filtration system, and in particular to a filtration system of a transmission.

BACKGROUND

A filtration system in a transmission is important for catching debris and other contaminants. This can be particularly true for a new transmission. During a conventional transmission assembly, components such as castings can introduce debris into the assembly and downstream from most conventional filters. This debris therefore can stick solenoids and valves before the transmission filtration system has an opportunity to filter out such debris. Thus, a need exists for an improved filtration system for a transmission assembly that is better able to filter out debris during all stages of operation, and further provide better serviceability and improvements with monitoring or adjusting fluid temperature within the assembly.

SUMMARY

In a first embodiment of the present disclosure, a hydraulic system of an automatic transmission includes a controller; a pump adapted to be driven by a torque-generating mechanism, the pump having an inlet and an outlet, where the pump is configured to generate fluid flow and pressure throughout the system; a fluid circuit fluidly coupled to the pump; a pressure regulator disposed in the fluid circuit for regulating pressure therein, the pressure regulator fluidly coupled to the pump outlet; a cooler circuit disposed in the fluid circuit and fluidly coupled to the pressure regulator; a filter disposed in the fluid circuit downstream from the cooler circuit; and a bypass circuit disposed in the fluid circuit and fluidly coupled to the pressure regulator, the bypass circuit including a valve movable between an open position and a closed position; wherein, in the open position, a first portion of fluid flowing from the pressure regulator flows through the bypass circuit and a second portion of the fluid flows through the cooler circuit and filter; further wherein, in the closed position, the fluid flowing from the pressure regulator only flows through the cooler circuit and filter.

In one example of this embodiment, a solenoid is disposed in the bypass circuit and electrically coupled to the controller, wherein the valve is selectively actuated by the solenoid between the open and closed positions. In a second example, the solenoid may include a wax pellet, an on/off solenoid, a variable bleed solenoid, a variable force solenoid, or a pulse-width modulating solenoid. In a third example, a pressure switch is disposed in the bypass circuit and electrically coupled to the controller, wherein the pressure switch detects movement of the valve between the open and closed positions. In a fourth example, the movement of the valve is operably controlled by the controller to control an amount of the first portion of fluid flowing through the bypass circuit and an amount of the second portion of fluid flowing through the cooler circuit and filter.

In a fifth example of this embodiment, the valve includes a length having a first width and a second width, the first width being different from and spaced longitudinally from the second width along the length, where the first width forms a first valve area and the second width forms a second valve area; further wherein, a force balance across the valve is achieved as a function of a difference in the first width and the second width, a solenoid pressure produced by the solenoid, a spring force from a spring disposed opposite the solenoid, a fluid pressure entering the bypass circuit, and a fluid pressure exiting the bypass circuit. In another example, a lube regulator and lube circuit are disposed within the fluid circuit, wherein the bypass circuit, cooler circuit, and filter are positioned upstream from the lube regulator and lube circuit. In a different example, a converter circuit is disposed within the fluid circuit, wherein the bypass circuit and filter are positioned downstream from the converter circuit. In yet a further example, the filter is positioned within the fluid circuit directly downstream of the cooler circuit.

In another embodiment of the present disclosure, a hydraulic control system of a transmission includes a controller; a pump adapted to be driven by a torque-generating mechanism; a fluid circuit fluidly coupled to the pump; a pressure regulator disposed in the fluid circuit for regulating pressure therein; a converter circuit, a controls circuit, and a cooler circuit each disposed in the fluid circuit and fluidly coupled to the pressure regulator, wherein at least the cooler circuit is downstream from the pressure regulator and converter circuit; a filter disposed in the fluid circuit downstream from the cooler circuit; and a bypass circuit disposed in the fluid circuit and fluidly coupled to the pressure regulator, the bypass circuit including a bypass valve and a solenoid, the bypass valve being movable between an open position and a closed position, and the solenoid being electrically coupled to the controller; wherein, in the open position, a first portion of fluid flowing from the pressure regulator flows through the bypass circuit and a second portion of the fluid flows through the cooler circuit and filter; further wherein, in the closed position, the fluid flowing from the pressure regulator only flows through the cooler circuit and filter.

In a first example of this embodiment, the valve is selectively actuated by the solenoid between the open and closed positions to control flow through the bypass circuit and cooler circuit. In a second example, a pressure switch is disposed in the bypass circuit and electrically coupled to the controller, wherein the pressure switch detects movement of the valve between the open and closed positions and communicates a signal to the controller indicative of said detected movement. In a third example, the bypass circuit includes an inlet in fluid communication with the pressure regulator and an outlet in fluid communication with a lube circuit; further wherein, the valve is movable between its open and closed positions based on a difference in fluid pressure between the inlet and the outlet.

In a fourth example of this embodiment, a lube regulator and lube circuit are disposed within the fluid circuit, wherein the bypass circuit, cooler circuit, and filter are positioned upstream from the lube regulator and lube circuit. In a fifth example, the bypass circuit, cooler circuit, and filter are positioned downstream from the converter circuit. In a sixth example, the filter is positioned within the fluid circuit directly downstream of the cooler circuit. In another example, the fluid circuit includes a first flow path fluidly coupled to an outlet of the converter circuit; a second flow path fluidly coupled to an inlet of the bypass circuit; a third flow path fluidly coupled to an inlet of the cooler circuit; a fourth flow path fluidly coupled between the cooler circuit and the filter; a fifth flow path fluidly coupled to an outlet of the bypass circuit; a sixth flow path fluidly coupled to an outlet of the filter; a seventh flow path fluidly coupled to an inlet of a lube circuit; a first junction formed between the first flow path, second flow path, and third flow path, where fluid flowing through the first flow path is divided at the first junction into the first portion flowing through the second flow path and the second portion flowing through the third flow path; and a second junction formed between the fifth flow path, the sixth flow path, and the seventh flow path, where fluid flowing through the fifth flow path and fluid flowing through the sixth flow path join at the second junction to flow through the seventh flow path.

In a different embodiment, a method of controlling fluid temperature in a hydraulic control system of a transmission includes providing a controller, a pump, a fluid circuit fluidly coupled to the pump, a pressure regulator, a cooler circuit disposed downstream from the pressure regulator, a fluid filter disposed downstream from the cooler circuit, a bypass circuit disposed downstream from the pressure regulator, the bypass circuit including a bypass valve and a solenoid; storing a temperature threshold within the controller; pressurizing fluid through the fluid circuit for operating the transmission; measuring fluid temperature with a temperature sensor and communicating the measured temperature to the controller; comparing the measured fluid temperature to the temperature threshold; selectively controlling movement of the bypass valve between a first position and a second position; and controlling an amount of fluid flowing through either the bypass circuit or the cooler circuit based on the position of the valve.

In a first example of this embodiment, the method includes energizing the solenoid to move the bypass valve between its first and second positions. In a second example, the method includes selectively moving the bypass valve to either its first position or second position to reduce fluid flow through the cooler circuit; and increasing fluid temperature due to the reduced fluid flow through the cooler circuit. In a third example, the method includes selectively moving the bypass valve to either its first position or second position to increase fluid flow through the cooler circuit; and reducing fluid temperature due to the increased fluid flow through the cooler circuit. In a fourth example, the method includes detecting movement of the bypass valve via a pressure switch disposed in the bypass circuit. In a fifth example, the method includes sending an instruction to the controller by the pressure switch when the bypass valve moves to either its first or second position.

In a sixth example of this embodiment, the method includes continuously performing the measuring and comparing steps; and selectively controlling the valve to open the bypass circuit for increasing fluid temperature, and close the bypass circuit for decreasing fluid temperature. In a seventh example, the method includes determining a pump speed of the pump; comparing the pump speed to a speed threshold; comparing the measured fluid temperature to a second temperature threshold, the second temperature threshold being indicative of a cold transmission; if the pump speed is greater than the speed threshold and the measured fluid temperature is greater than the second temperature threshold, controlling a first portion of fluid flow through the bypass circuit and a second portion of fluid flow through the cooler circuit, wherein the second portion is less than 10% of the total amount of fluid flowing from the pressure regulator; and rapidly increasing fluid temperature by substantially reducing fluid flow through the cooler circuit. In an eighth example, the method includes actuating the bypass valve between its first and second positions without selectively controlling the solenoid. In a ninth example, the bypass valve is actuated between its first and second positions based on a pressure difference between an inlet and an outlet of the bypass circuit.

In yet another embodiment of the present disclosure, a method of detecting a plugged filter condition within a hydraulic control system of a transmission, includes providing a controller, a pump, a fluid circuit fluidly coupled to the pump, a pressure regulator, a cooler circuit disposed downstream from the pressure regulator, a fluid filter disposed downstream from the cooler circuit, a lube circuit disposed downstream from the cooler circuit and filter, and a bypass circuit disposed downstream from the pressure regulator, the bypass circuit including a bypass valve; pressurizing fluid through the fluid circuit for operating the transmission; detecting a movement of the bypass valve from a first position to a second position; communicating a command to the controller indicative of a detected movement of the bypass valve; determining fluid flow through the lube circuit at the detected movement of the bypass valve; comparing the fluid flow to a flow threshold; and triggering an alert signal to service the fluid filter if the fluid flow is equal to or less than the flow threshold.

In a first example of this embodiment, the method includes determining a first pump speed of the pump at a first movement of the bypass valve from a first position to a second position where the bypass circuit opens to fluid flow from the pressure regulator; storing the first pump speed in the controller; determining a second pump speed of the pump at a second movement of the bypass valve from the first position to the second position; comparing the first pump speed to the second pump speed; and triggering another alert signal if a difference between the first pump speed and second pump speed exceeds a speed threshold. In a second example, the method includes determining a first fluid pressure at an inlet of the bypass circuit and a second fluid pressure at an outlet thereof; and triggering another alert signal if a difference between the first fluid pressure and the second fluid pressure exceeds a pressure threshold. In another example, the method includes detecting a first movement and a second movement of the bypass valve; recording a first time value associated with the detected first movement and a second time value associated with the detected second movement; determining a first fluid flow through the lube circuit at the first movement and a second fluid flow at the second movement; comparing the second fluid flow to the flow threshold; and triggering a second alert signal to service the transmission if (a) the second fluid flow is equal to or less than the flow threshold and (b) a difference between the first time value and second time value is less than a timing threshold.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
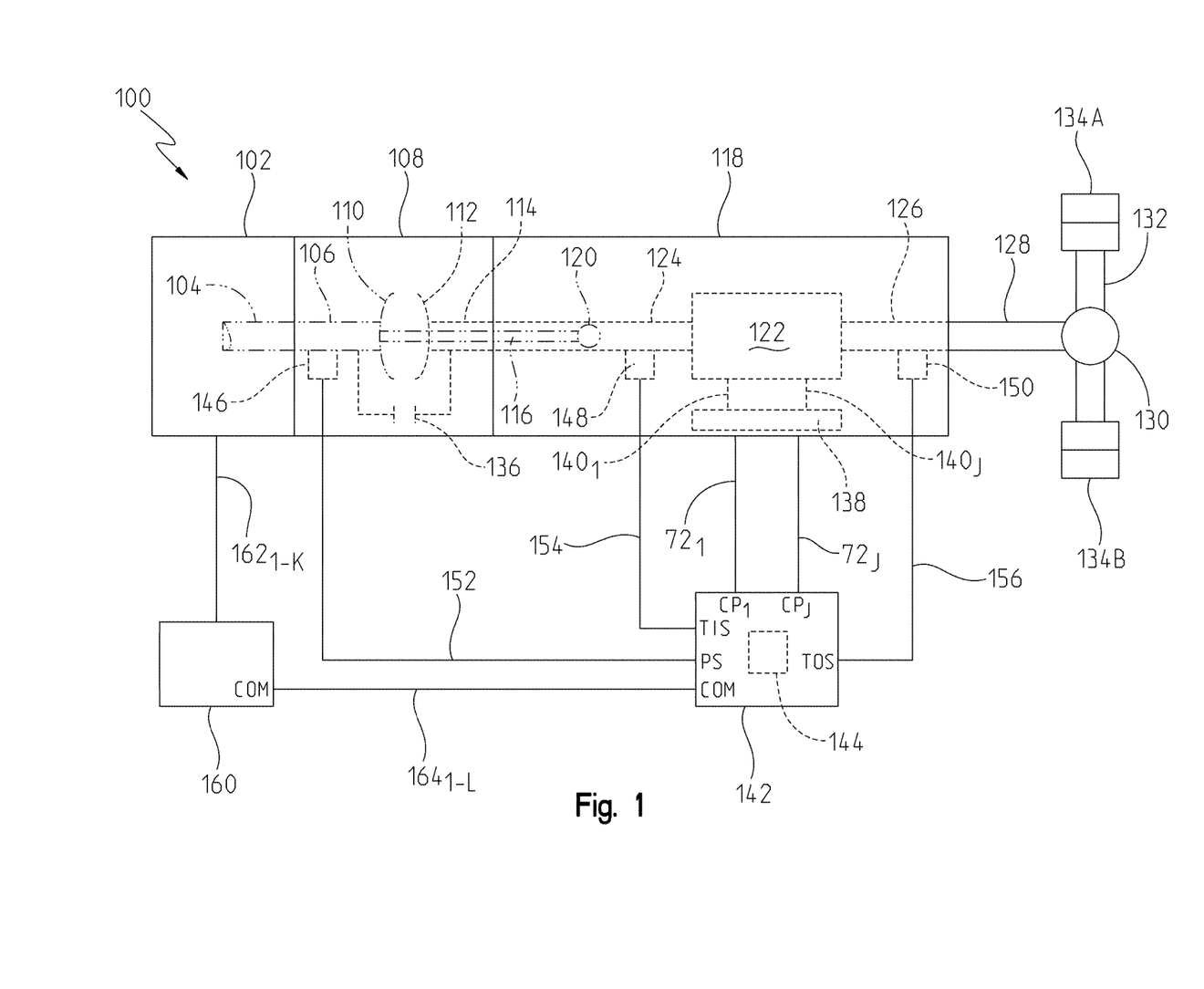
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic variable displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
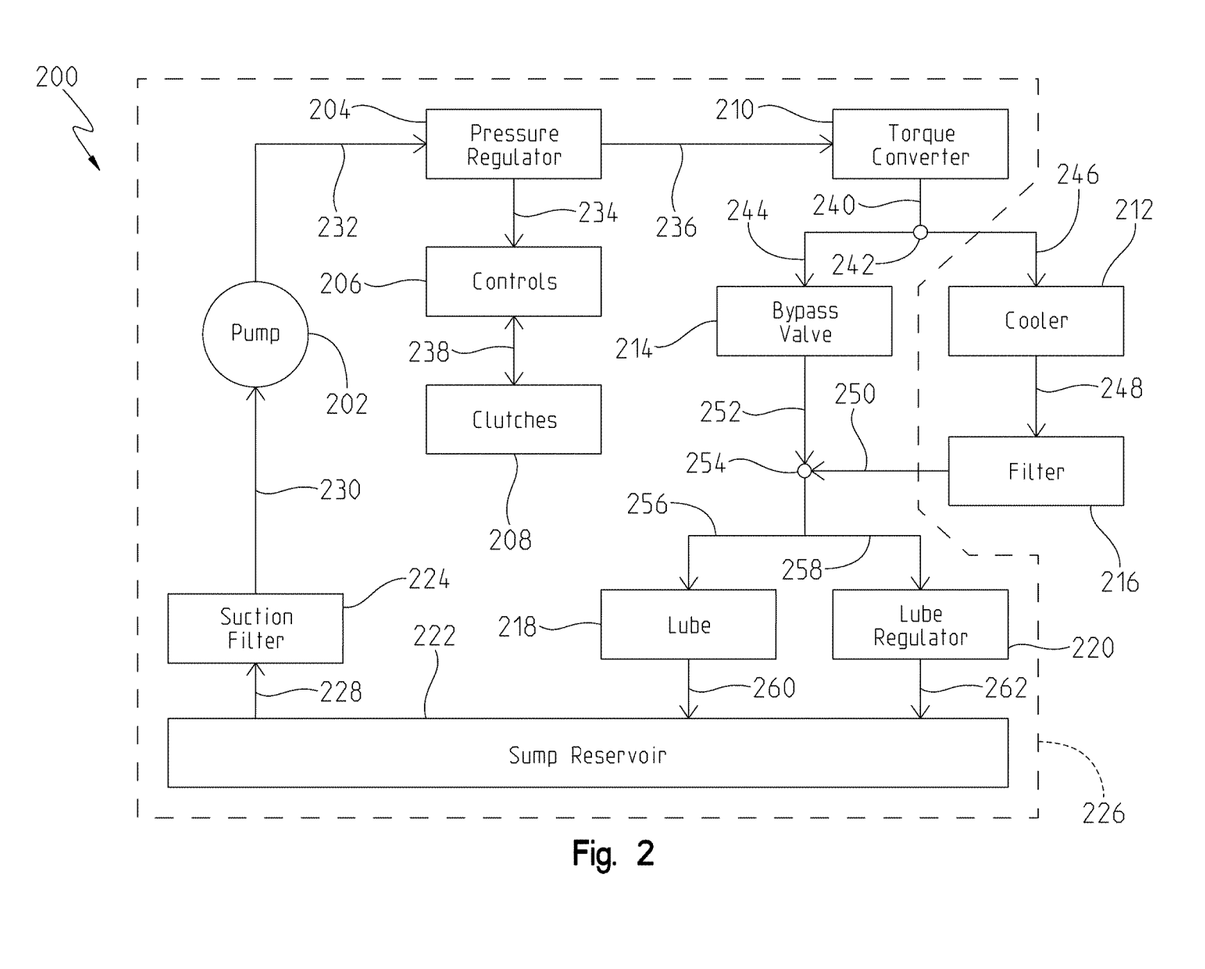
FIG. 2 is a schematic view of one embodiment of a transmission assembly.

Referring to FIG. 2, an embodiment of a transmission assembly 200 is shown. In this assembly 200, a transmission 200 and various internal components, circuits and systems are shown. The transmission 200 may include an outer housing 226 that encloses or substantially encloses its internal components, circuits and systems. The transmission 200 may include, for example, a hydraulic pump 202 having a suction side and pressure side. The pump 202 can be a variable displacement pump, rotary pump, centrifugal pump, etc. This disclosure is not limited to the type of pump that may be used for the transmission assembly 200. In FIG. 2, the pump 202 is shown being disposed internal of the transmission 226.

The pump 202 can be in fluid communication with a sump reservoir 222 such that fluid from the reservoir can be suctioned through a filter 224 and to the suction side of the pump 202. In FIG. 2, fluid can be suctioned via a first flow path 228 from the sump reservoir 222 to the suction filter 224. Debris and other contaminants can be separated from the fluid via the suction filter 224, and the remaining fluid can flow via a second flow path 230 to the pump 202. The fluid can then be pumped from the pressure side of the pump 202 to a pressure regulator 204 via a third flow path 232.

The pressure regulator 204 can be in the form of a valve that regulates fluid pressure through a hydraulic system of the transmission assembly 200. For example, the pressure regulator 204 can regulate fluid flow to a controls circuit 206 via a fourth flow path and a torque converter circuit 210 via a fifth flow path 236. The controls circuit 206 can be in fluid communication with one or more brakes or clutches 208 for selective engagement thereof to achieve different gear ratios. Fluid communication between the controls circuit 206 and the brakes or clutches 208 may be achieved via a sixth flow path 238.

The torque converter circuit 210 may be part of the overall hydraulic system of the transmission for receiving and transferring fluid from a torque converter. In some embodiments, the torque converter may be coupled to the transmission 226 and be external thereto. In any event, at least a portion of the torque converter circuit 210 is disposed internally of the transmission 226 and fluidly coupled to the pressure regulator 204. Fluid that flows along a converter in fluid path 236 to the torque converter circuit 210 can further exit therefrom via a converter out flow path 240.

Figure 3:
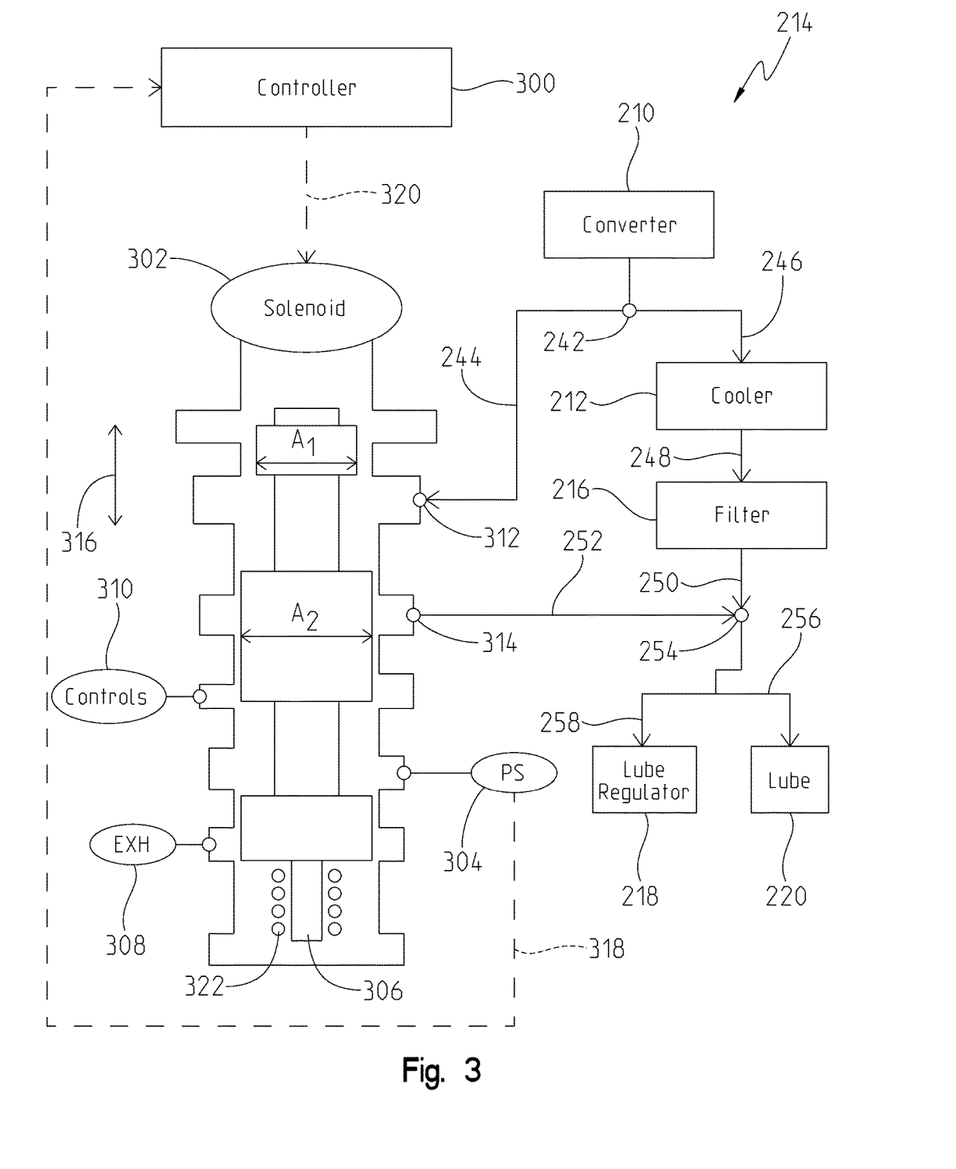
FIG. 3 is a schematic view of a bypass valve of the transmission assembly of FIG. 2.

As shown in FIGS. 2 and 3, the converter out flow path 240 can diverge at a junction point 242. At the junction point 242, the fluid can flow along at least one of two different flow paths, i.e., an eighth flow path 244 or a ninth flow path 246. The eighth flow path, or bypass flow path, fluidly couples a bypass circuit 214 with an outlet of the torque converter circuit 210. The bypass circuit 214 and its operation will be further described below with reference to FIG. 3.

The ninth flow path 246 fluidly couples a cooler circuit 212 with the outlet of the torque converter circuit 210. The cooler circuit 212 is further fluidly coupled to a cooler system, such as a vehicle cooler, that may be external from the transmission 226. Fluid temperature can be monitored or controlled as it flows through either the cooler circuit 212 or bypass circuit 214. This too will be described in more detail below with reference to FIGS. 3 and 5.

For fluid that passes through the cooler circuit 212, a high filtration filter 216 can be disposed along fluid path 248 such that any debris or contaminants in the fluid can be effectively filtered via the filter 216. The filter 216 can further represent a flow restriction in the flow path such that fluid may more easily travel through the bypass flow path 244 due to the restriction of the filter 216.

Fluid that passes through the filter 216 can flow along another flow path 250 until it reaches a junction 254 or intersection with flow path 252. Flow path 252 is fluidly coupled with an outlet of the bypass circuit 214. Fluid flowing through both paths 250 and 252 can converge at the junction 254 to form a single flow. After the junction 254, fluid can flow to either a lube regulator 220 via flow path 258 or a lube circuit 218. Fluid flow to the lube circuit 218 may be regulated by the lube regulator 220. Fluid passing through the lube circuit 218 can then return to the sump reservoir 222 via flow path 260, whereas flow through the lube regulator 220 can return to the sump reservoir 222 via flow path 262.

The different circuits, systems and flow paths described above and shown in FIG. 2 is intended to only represent a single embodiment of the transmission assembly 200. Other transmission assemblies may include fewer or additional circuits, systems, or flow paths. In many conventional transmission assemblies, however, there is an inability to filter fluid flow downstream from the cooler circuit. In FIG. 2, however, the filter 216 can disposed downstream from the cooler circuit 212 to enable proper fluid filtering. Moreover, with the filter 216 positioned external to the transmission 226 (e.g., the transmission housing or case), the filter 216 can be easily accessed and serviced. Thus, the location of the filter 216 in FIG. 2 can be desirable for both its filtering function downstream of the cooler and its serviceability relative to the transmission 226.

Another feature of the embodiment illustrated in FIG. 2 is the ability to detect when the filter 216 is plugged, or more desirably, when to replace the filter 216 before it becomes plugged. This too can be achieved in the embodiment of FIG. 2 via the bypass circuit 214. Referring to FIG. 3, the bypass circuit 214 is shown in greater detail. The bypass circuit 214, for example, can include a bypass valve 306 that can be actuated by a solenoid 302. The solenoid 302 can be in the form of a wax pellet, an on/off solenoid, a variable bleed solenoid (VBS), a variable force solenoid (VFS), a pulse width modulation (PWM) solenoid, or any other known solenoid. The solenoid 302 can be energized or de-energized for actuating the bypass valve 306 in a direction indicated by arrow 316 in FIG. 3. As the valve 306 is actuated, flow through the bypass flow path 252 can either be opened or closed.

The solenoid 302 can be controlled by a controller 300. The controller 300 can be the transmission control circuit 142, for example. Communication between the controller 300 and the solenoid 302 may be achieved via communication link 320. This communication link 320 can be a wired or wireless link. As such, the controller 300 can identify a set of conditions and send a signal to the solenoid to stroke or de-stroke the bypass valve 306. This may be for controlling fluid temperature in the transmission when an engine is about to be ignited, or for monitoring sump temperature during normal operation. This will be described in further detail below.

The bypass circuit 214 can further include a plurality of ports fluidly coupled to different flow paths or circuits. For example, an exhaust port 308 is fluidly coupled with the bypass valve 306 so that fluid can be exhausted to the sump reservoir 222. A controls port 310 may also be in fluid communication with the valve 306 so that fluid can be directed to the controls circuit 206. The bypass circuit 214 may also be in communication with a pressure switch 304. The pressure switch 304 may be located in the controls circuit 206 or elsewhere in the transmission. In any event, the pressure switch 304 can be in communication with the controller 300 via another communication link 318. This communication link 318 can be a wired or wireless link as well.

The bypass circuit further includes a converter out flow port 312 and a bypass flow port 314. Fluid that exits the converter circuit 210 can enter the bypass circuit 214 via the converter out flow port 312. In some respects, a pressure sensor or flow meter can be disposed at this port 312 for measuring characteristics of the fluid flow entering the bypass circuit 214. A temperature sensor may also be coupled at this port for measuring fluid temperature. Fluid that exits the bypass circuit 214 via the bypass flow port 314 is fluidly coupled to and flows through the bypass flow path 252. As such, any fluid that flows through the bypass flow path 252 does not pass through the cooler circuit 212 or the after cooler filter 216.

With the solenoid 302, the controller 300 can actively control the flow of fluid through the bypass circuit 214. However, fluid may also pass through the bypass circuit 214 via an inactive means. For instance, if the pressure drop across the bypass valve 306 exceeds a threshold value, the valve 306 may actuate in one of two directions as indicated by arrow 316. This inactive bypass feature is due to the differential areas along the longitudinal axis of the valve 306. As shown in FIG. 3, the valve 306 has a first area defined as "$A_1$" and a second area defined as "$A_2$". Here, A1 and A2 may also reference a diameter such that the actual area of each valve portion may be found as follows:

$$\text{Area of valve portion} = \pi \ast (\text{Diameter}/2)^2$$

The pressure drop across the valve 306 can therefore be determined from the following force equation:

$$(\text{Solenoid Pressure}) \ast A_1 + (\text{Converter Out Pressure}) \ast (A_2 - A_1) = (\text{Return Spring Force})$$

In the above force equation, the return spring force refers to a return spring 322 disposed opposite the solenoid 302. When the pressure drop exceeds the threshold, the valve 306 can stroke and either open or close the bypass circuit to flow. In this instance, the pressure switch 304 can detect the movement of the valve 306 and communicate this to the controller 300. In effect, the controller 300 can use this information to track and monitor the opening and closing of the bypass circuit 214. In an active control of the bypass valve 306, the pressure switch 304 may also confirm actuation of the valve 306 to the controller 300. If the valve 306 does not stroke and the controller 300 does not receive a confirmation instruction from the pressure switch 304, the controller 300 may interpret a possible stuck valve or solenoid. In turn, the controller 300 may send an alert of this condition to a dashboard, for example, of a vehicle for notifying a vehicle operator.

With the passive actuation of the bypass valve 306, the controller may further monitor the condition of the filter 216. The bypass valve 306 may automatically move to the open position, i.e., opening the bypass flow path 252, when the pressure drop exceeds a certain threshold. This threshold can be set such that the valve does not stroke to the open position unless the pressure drop is high. For instance, the controller 300 can be programmed or designed to detect when the filter 216 is plugged and needs serviced. Alternatively, the controller 300 can further detect possible damage internal to the transmission based on the passive actuation of the bypass valve 306.

Figure 4:
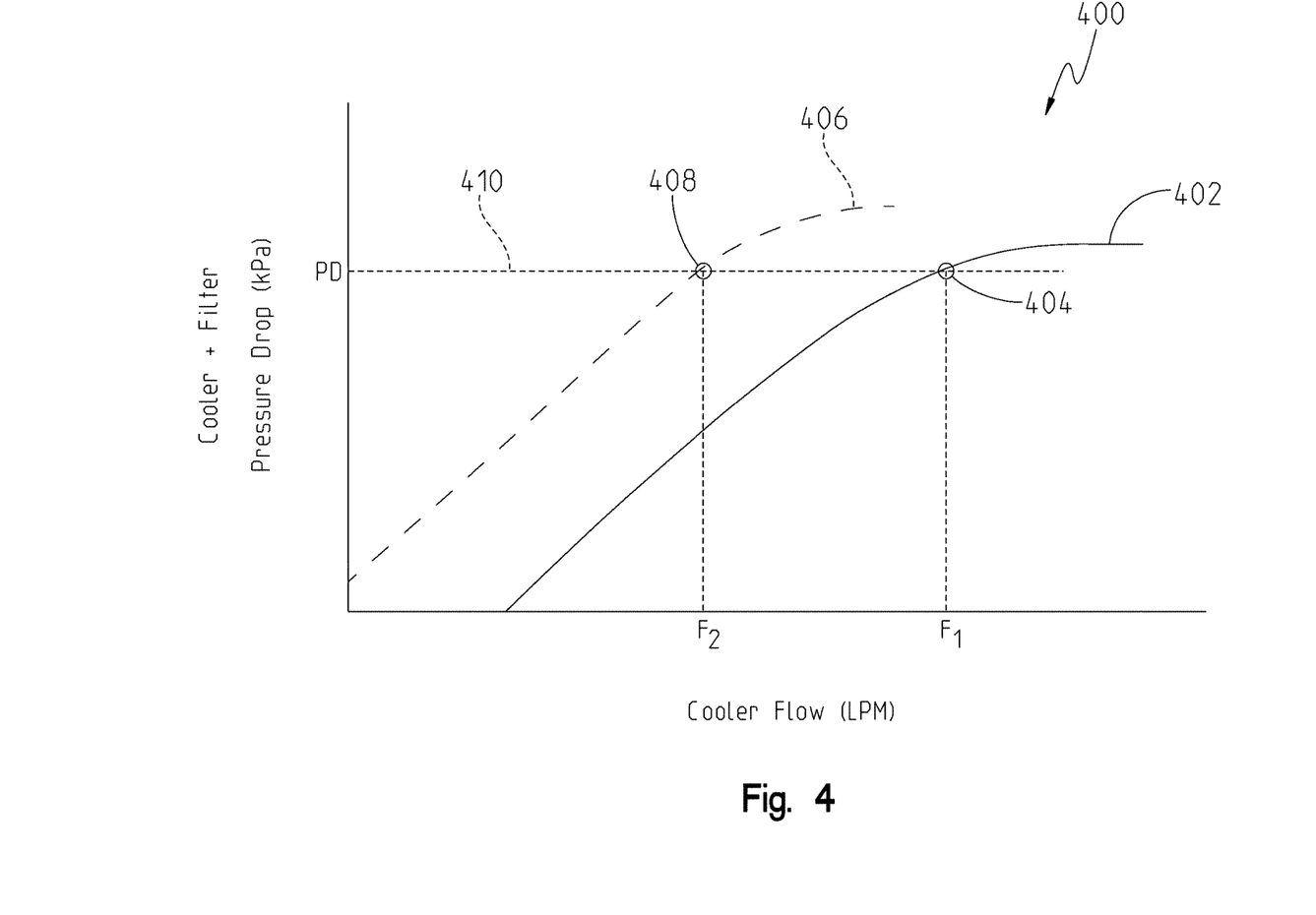
FIG. 4 is a graphical representation of cooler flow and pressure drop.

Referring to FIG. 4, a graphical illustration 400 shows pressure drop (psi) as a function of cooler flow (LPM). In this graph 400, a first curve 402 is shown representative of combined cooler and filter pressure drop. A pressure drop threshold (PD) line 410 is shown as being indicative of when the bypass valve 306 strokes from its closed position to its open position without being commanded to by the controller 300. The first curve 402 is shown intersecting with the pressure drop threshold line 410 at a first set point 404. During operation, cooler flow can increase and decrease along the first curve 402, and as it reaches the first set point 404 the pressure drop threshold is achieved. At this point, the force balance across the bypass valve 306 induces the valve to stroke to its open position. The pressure switch 304 can detect this movement and output a signal to the controller 300 indicative of the valve state change. The controller 300 can record each time the valve 306 actuates to the open position as a result of the pressure drop. The controller 300 may include an internal clock or timing mechanism for recording a time value associated with each time the valve 306 actuates to the open position.

Moreover, during operation of the transmission, debris and other contaminants can be filtered from the transmission fluid and captured by the filter 216. As this occurs, the filter 216 increasingly restricts fluid flow therethrough and more fluid is forced through the bypass flow path 252. As a result, the cooler flow curve 402 can shift to the left as shown in FIG. 4. Once the curve reaches a certain point or threshold, e.g., a second pressure curve 406 with a second set point 408, the controller 300 can be programmed to communicate an alert indicative of a need to service the filter 216. This second curve 406 can be predetermined and stored as a set of instructions in a memory unit of the controller 300. Alternatively, this can be stored as a lookup table or graph in the controller 300. In any event, the controller 300 can continuously monitor the pressure curve and detect a point in time when the curve reaches the threshold curve 406 of FIG. 4. At this point, the controller 300 is programmed to communicate that the filter 216 is either plugged or otherwise needs service.

Although not shown, the controller 300 may be in electrical communication with a user interface such as a dashboard in a vehicle or machine. The interface may include a display for displaying the alert so that an operator of the vehicle or machine is notified of the service need. As described above, the filter 216 can be coupled to the transmission at a location that is external to the transmission housing, allowing the filter to be more easily and quickly serviced.

A plugged filter, or a detection thereof, is indicative of a number of factors. A lookup table stored in the controller may include variables such as pump speed, temperature, pressure, flow, etc. At a lower temperature, the transmission fluid may have a higher viscosity than at a higher temperature, and thus flow through the filter 216 will be more restrictive. This, in effect, can be taken into account by the controller 300. The controller 300 can receive temperature measurements from a thermistor or sensor located in the controls 206. This temperature can correspond to sump temperature. If the sump temperature is below a threshold temperature, the controller 300 may be programmed to delay taking any action with respect to actuation of the bypass valve 306. For example, at a lower temperature the controller 300 can identify in a lookup table that due to the fluid temperature, the valve 306 may stroke to its open position to allow more flow through the bypass circuit so that the fluid temperature increases to a better operating temperature. Once the fluid temperature rises above the threshold temperature, however, the controller can identify this condition from the lookup table and begin monitoring passive actuation of the bypass valve.

As described above, the controller 300 may also including an internal clock or timing mechanism used for timing the passive actuation of the bypass valve 306 due to the pressure drop. This can be useful when a sudden increase in pressure drop is detected and the bypass valve actuates to its open position. In FIG. 4, for example, the pressure curve 402 may suddenly shift to the left towards the threshold curve 406. If the controller 300 detects this sudden shift, the detection may correspond to possible damage within the transmission. In other words, the controller 300 can monitor the rate of change of the cooler flow set point over time when the bypass valve 306 switches between positions. If the rate of change meets a certain timing threshold, the controller 300 can be programmed to interpret whether the rate of change is indicative of a need to replace the filter or possible damage to the transmission. The controller 300 can therefore send an alert to the operator based on this interpretation to service the filter or transmission.

While FIG. 4 illustrates one embodiment in which pressure drop is monitored, other embodiments can achieve similar results by monitoring temperature. A gradual or sudden increase in temperature may correspond to a plugged filter. Other alternatives may exist such as pressure or flow. For example, a leakage adaptive constant for cooler flow may continuously be detected as the bypass valve 306 actuates between its open and closed positions. The leakage adaptive constant can be monitored with respect to engine or pump speed, and as the bypass valve strokes to the open position over time it may do so gradually at lower engine speeds. At a certain engine speed threshold, however, the controller 300 can detect the gradual plugging of the filter 216 and communicate a signal to the operator to service the filter 216. Moreover, a more sudden decrease in engine speed may correspond to a more urgent servicing need of the filter or transmission, and the controller 300 can detect this via the leakage adaptive constant. The manner in which a leakage adaptive constant may be determined is described in U.S. Publication Ser. Nos. 2014/0260223, 2014/0260228, and 2014/0260229, which are hereby incorporated by reference in their entirety as if fully set forth herein.

Figure 5:
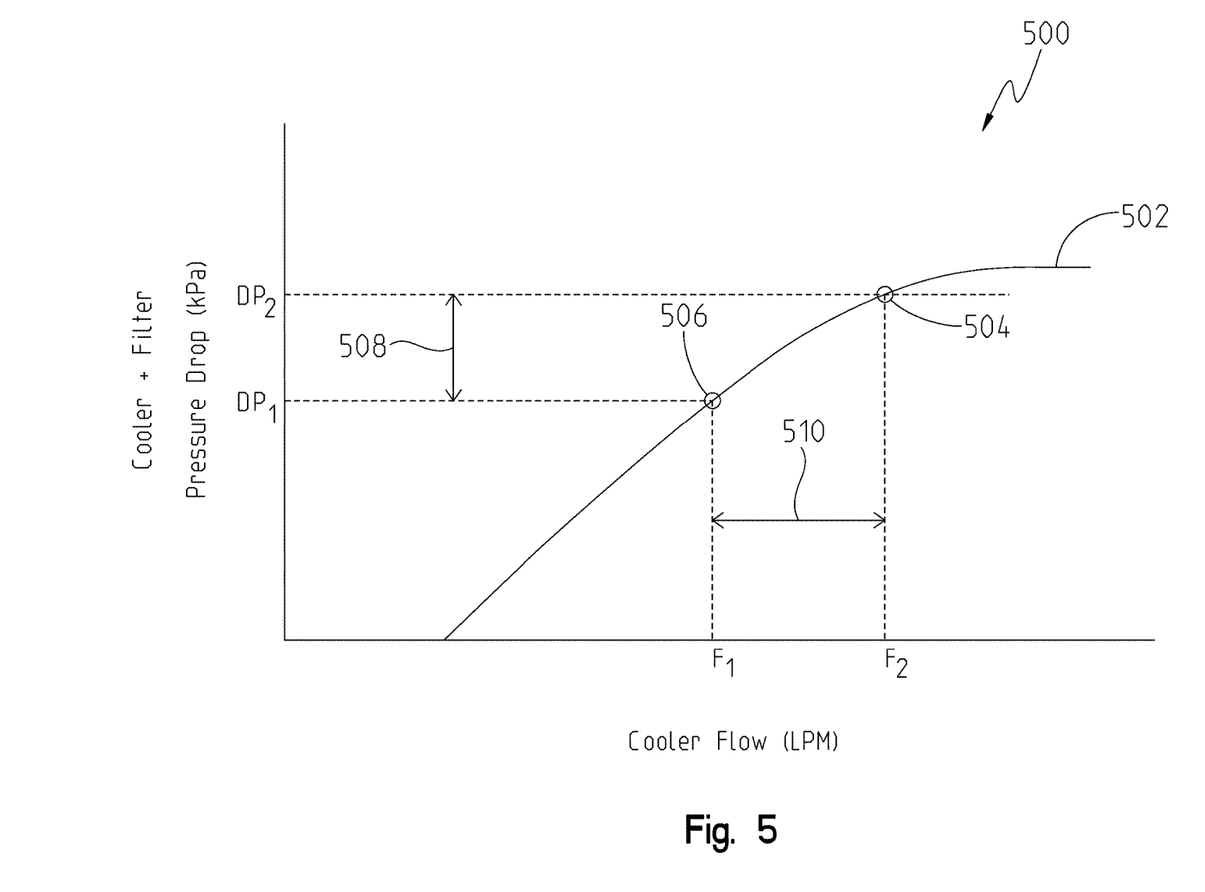
FIG. 5 is another graphical representation of cooler flow and pressure.

Another aspect of this disclosure is illustrated in FIG. 5. Here, a graphical illustration 500 shows pressure drop across the cooler and filter with respect to cooler flow. In this embodiment, the controller 300 can be programmed to execute a set of instructions for controlling sump temperature of the operating fluid. As shown in FIGS. 2 and 3, fluid can flow through one of two flow paths, i.e., via flow paths 246, 248, and 250 through the cooler 212 and filter 216, or via flow paths 244 and 252 through the bypass circuit 214. Due to the inherent restriction of the filter 216, a less restrictive path is through the bypass circuit 214. As described above, the controls 206 may include a temperature sensor capable of detecting sump temperature and communicating this temperature to the controller 300. As such, the controller 300 can selectively open and close the bypass circuit by energizing or de-energizing the solenoid 302. If more fluid flows through the bypass circuit 214, the temperature of the fluid can increase. If less fluid flows through the bypass circuit 214, then it flows through the cooler 212 and the fluid temperature may decrease, rise more gradually or remain substantially the same. In one instance, the restriction of the filter 216 may cause approximately 75-80% of the fluid to flow through the bypass circuit 214.

In FIG. 5, a curve 502 may include a first set point 504 and a second set point 506. At the first set point 504, there is greater cooler flow and more fluid passes through the cooler 212. At the second set point 506, however, there is less cooler flow (i.e., a difference in cooler flow represented by 510) and a lower pressure drop (i.e., a difference in pressure drop represented by 508) compared to at the first set point 504. Thus, the controller 300 may be programmed with these two set points, or alternatively a plurality of set points along the curve 502, such that the controller can control sump temperature by either increasing or reducing cooler flow and pressure drop across the cooler and filter. As described above, this is possible due to the active actuation of the bypass valve 306 due to the energizing or de-energizing of the solenoid 302.

At startup, the operating fluid may be cold or at a temperature below ideal operating condition. The controller 300 can effectively increase fluid temperature more rapidly by controlling solenoid pressure, actuating the bypass valve to its open position and inducing more fluid to bypass the cooler 212. Thus, when warming the engine and transmission, the controller 300 can control the bypass valve 306 to its open position, monitor fluid temperature and once the temperature reaches a certain threshold temperature, the controller can selectively de-energize the solenoid 302 and move the valve 306 to its closed position.

While the above embodiment is described with respect to sump temperature, it is further possible to detect the temperature of the fluid exiting the converter circuit 210 and using that temperature to adjustably control fluid temperature. This may be the case, for example, when a wax pellet is used instead of an On/Off solenoid (may use sump temperature). Moreover, the set point for triggering the bypass circuit 214 open can be decreased to near zero pressure drop to maintain the bypass valve 306 in its open position for more rapidly increasing fluid temperature. The controller 300 may have a set of instructions that monitors fluid temperature and engine or pump speed, and as a result of both measures the controller can adjust the set point to a desired value.

In some industries, there is a push towards using a thinner fluid to reduce transmission spin losses. The present disclosure provides an alternative solution to using a different type of fluid. Here, the fluid temperature can be adjusted to a higher operating temperature to reduce viscosity and spin losses. For instance, the fluid temperature may be increased from 80° C. to 90° C. by monitoring fluid temperature and flowing more fluid through the bypass circuit 214 than the cooler circuit 212. Thus, the ability to control fluid sump temperature can allow the transmission to operate under better operating conditions with reduced spin losses without using a different fluid type.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A hydraulic system of an automatic transmission, comprising:
   a controller;
   a pump adapted to be driven by a torque-generating mechanism, the pump having an inlet and an outlet, where the pump is configured to generate fluid flow and pressure throughout the system;
   a fluid circuit fluidly coupled to the pump;
   a pressure regulator disposed in the fluid circuit for regulating pressure therein, the pressure regulator fluidly coupled to the pump outlet;
   a cooler circuit disposed in the fluid circuit and fluidly coupled to the pressure regulator;
   a filter disposed in the fluid circuit downstream from the cooler circuit;
   a bypass circuit disposed in the fluid circuit and fluidly coupled to the pressure regulator, the bypass circuit including a valve movable between an open position and a closed position; and
   a solenoid disposed in the bypass circuit and electrically coupled to the controller, wherein the valve is selectively actuated by the solenoid between the open and closed positions;
   wherein, in the open position, a first portion of fluid flowing from the pressure regulator flows through the bypass circuit and a second portion of the fluid flows through the cooler circuit and filter;
   further wherein, in the closed position, the fluid flowing from the pressure regulator only flows through the cooler circuit and filter.

2. The hydraulic system of claim 1, wherein the solenoid comprises a wax pellet, an on/off solenoid, a variable bleed solenoid, a variable force solenoid, or a pulse-width modulating solenoid.

3. The hydraulic system of claim 1, further comprising a pressure switch disposed in the bypass circuit and electrically coupled to the controller, wherein the pressure switch detects movement of the valve between the open and closed positions.

4. The hydraulic system of claim 1, wherein the movement of the valve is operably controlled by the controller to control an amount of the first portion of fluid flowing through the bypass circuit and an amount of the second portion of fluid flowing through the cooler circuit and filter.

5. The hydraulic system of claim 1, wherein the valve comprises a length having a first width and a second width, the first width being different from and spaced longitudinally from the second width along the length, where the first width forms a first valve area and the second width forms a second valve area;

further wherein, a force balance across the valve is achieved as a function of a difference in the first width and the second width, a solenoid pressure produced by the solenoid, a spring force from a spring disposed opposite the solenoid, a fluid pressure entering the bypass circuit, and a fluid pressure exiting the bypass circuit.

6. The hydraulic system of claim 1, further comprising a lube regulator and lube circuit disposed within the fluid circuit, wherein the bypass circuit, cooler circuit, and filter are positioned upstream from the lube regulator and lube circuit.

7. The hydraulic system of claim 1, further comprising a converter circuit disposed within the fluid circuit, wherein the bypass circuit and filter are positioned downstream from the converter circuit.

8. The hydraulic system of claim 1, wherein the filter is positioned within the fluid circuit directly downstream of the cooler circuit.

9. A hydraulic control system of a transmission, comprising:
a controller;
a pump adapted to be driven by a torque-generating mechanism;
a fluid circuit fluidly coupled to the pump;
a pressure regulator disposed in the fluid circuit for regulating pressure therein;
a converter circuit, a controls circuit, and a cooler circuit each disposed in the fluid circuit and fluidly coupled to the pressure regulator, wherein at least the cooler circuit is downstream from the pressure regulator and converter circuit;
a filter disposed in the fluid circuit downstream from the cooler circuit; and
a bypass circuit disposed in the fluid circuit and fluidly coupled to the pressure regulator, the bypass circuit including a bypass valve and a solenoid, the bypass valve being movable between an open position and a closed position, and the solenoid being electrically coupled to the controller;
wherein, in the open position, a first portion of fluid flowing from the pressure regulator flows through the bypass circuit and a second portion of the fluid flows through the cooler circuit and filter;
further wherein, in the closed position, the fluid flowing from the pressure regulator only flows through the cooler circuit and filter.

10. The hydraulic control system of claim 9, wherein the valve is selectively actuated by the solenoid between the open and closed positions to control flow through the bypass circuit and cooler circuit.

11. The hydraulic control system of claim 9, further comprising a pressure switch disposed in the bypass circuit and electrically coupled to the controller, wherein the pressure switch detects movement of the valve between the open and closed positions and communicates a signal to the controller indicative of said detected movement.

12. The hydraulic control system of claim 9, wherein the bypass circuit comprises an inlet in fluid communication with the pressure regulator and an outlet in fluid communication with a lube circuit;
further wherein, the valve is movable between its open and closed positions based on a difference in fluid pressure between the inlet and the outlet.

13. The hydraulic control system of claim 9, further comprising a lube regulator and lube circuit disposed within the fluid circuit, wherein the bypass circuit, cooler circuit, and filter are positioned upstream from the lube regulator and lube circuit.

14. The hydraulic control system of claim 9, wherein the bypass circuit, cooler circuit, and filter are positioned downstream from the converter circuit.

15. The hydraulic control system of claim 9, wherein the filter is positioned within the fluid circuit directly downstream of the cooler circuit.

16. The hydraulic control system of claim 9, wherein the fluid circuit comprises:
a first flow path fluidly coupled to an outlet of the converter circuit;
a second flow path fluidly coupled to an inlet of the bypass circuit;
a third flow path fluidly coupled to an inlet of the cooler circuit;
a fourth flow path fluidly coupled between the cooler circuit and the filter;
a fifth flow path fluidly coupled to an outlet of the bypass circuit;
a sixth flow path fluidly coupled to an outlet of the filter;
a seventh flow path fluidly coupled to an inlet of a lube circuit;
a first junction formed between the first flow path, second flow path, and third flow path, where fluid flowing through the first flow path is divided at the first junction into the first portion flowing through the second flow path and the second portion flowing through the third flow path; and
a second junction formed between the fifth flow path, the sixth flow path, and the seventh flow path, where fluid flowing through the fifth flow path and fluid flowing through the sixth flow path join at the second junction to flow through the seventh flow path.

17. The hydraulic control system of claim 9, further comprising an outer housing of the transmission, wherein the fluid circuit, cooler circuit, and bypass circuit are disposed internally within the outer housing, and the filter is disposed externally of the outer housing.

18. A method of controlling fluid temperature in a hydraulic control system of a transmission, comprising:
providing a controller, a pump, a fluid circuit fluidly coupled to the pump, a pressure regulator, a cooler circuit disposed downstream from the pressure regulator, a fluid filter disposed downstream from the cooler circuit, a bypass circuit disposed downstream from the pressure regulator, the bypass circuit including a bypass valve and a solenoid;
storing a temperature threshold within the controller;
pressurizing fluid through the fluid circuit for operating the transmission;
measuring fluid temperature with a temperature sensor and communicating the measured temperature to the controller;
comparing the measured fluid temperature to the temperature threshold;
selectively controlling movement of the bypass valve between a first position and a second position; and
controlling an amount of fluid flowing through either the bypass circuit or the cooler circuit based on the position of the valve.

19. The method of claim 18, further comprising energizing the solenoid to move the bypass valve between its first and second positions.

20. The method of claim 18, further comprising:
selectively moving the bypass valve to either its first position or second position to reduce fluid flow through the cooler circuit; and
increasing fluid temperature due to the reduced fluid flow through the cooler circuit.

21. The method of claim 18, further comprising:
selectively moving the bypass valve to either its first position or second position to increase fluid flow through the cooler circuit; and
reducing fluid temperature due to the increased fluid flow through the cooler circuit.

22. The method of claim 18, further comprising detecting movement of the bypass valve via a pressure switch disposed in the bypass circuit.

23. The method of claim 22, further comprising sending an instruction to the controller by the pressure switch when the bypass valve moves to either its first or second position.

24. The method of claim 18, further comprising:
continuously performing the measuring and comparing steps; and
selectively controlling the valve to open the bypass circuit for increasing fluid temperature, and close the bypass circuit for decreasing fluid temperature.

25. The method of claim 18, further comprising:
determining a pump speed of the pump;
comparing the pump speed to a speed threshold;
comparing the measured fluid temperature to a second temperature threshold, the second temperature threshold being indicative of a cold transmission;
if the pump speed is greater than the speed threshold and the measured fluid temperature is greater than the second temperature threshold, controlling a first portion of fluid flow through the bypass circuit and a second portion of fluid flow through the cooler circuit, wherein the second portion is less than 10% of the total amount of fluid flowing from the pressure regulator; and
rapidly increasing fluid temperature by substantially reducing fluid flow through the cooler circuit.

26. The method of claim 18, further comprising actuating the bypass valve between its first and second positions without selectively controlling the solenoid.

27. The method of claim 26, wherein the bypass valve is actuated between its first and second positions based on a pressure difference between an inlet and an outlet of the bypass circuit.

28. A method of detecting a plugged filter condition within a hydraulic control system of a transmission, comprising:
providing a controller, a pump, a fluid circuit fluidly coupled to the pump, a pressure regulator, a cooler circuit disposed downstream from the pressure regulator, a fluid filter disposed downstream from the cooler circuit, a lube circuit disposed downstream from the cooler circuit and filter, and a bypass circuit disposed downstream from the pressure regulator, the bypass circuit including a bypass valve;
pressurizing fluid through the fluid circuit for operating the transmission;
detecting a movement of the bypass valve from a first position to a second position;
communicating a command to the controller indicative of a detected movement of the bypass valve;
determining fluid flow through the lube circuit at the detected movement of the bypass valve;
comparing the fluid flow to a flow threshold; and
triggering an alert signal to service the fluid filter if the fluid flow is equal to or less than the flow threshold.

29. The method of claim 28, further comprising:
determining a first pump speed of the pump at a first movement of the bypass valve from a first position to a second position where the bypass circuit opens to fluid flow from the pressure regulator;
storing the first pump speed in the controller;
determining a second pump speed of the pump at a second movement of the bypass valve from the first position to the second position;
comparing the first pump speed to the second pump speed; and
triggering another alert signal if a difference between the first pump speed and second pump speed exceeds a speed threshold.

30. The method of claim 28, comprising:
determining a first fluid pressure at an inlet of the bypass circuit and a second fluid pressure at an outlet thereof; and
triggering another alert signal if a difference between the first fluid pressure and the second fluid pressure exceeds a pressure threshold.

31. The method of claim 28, further comprising:
detecting a first movement and a second movement of the bypass valve;
recording a first time value associated with the detected first movement and a second time value associated with the detected second movement;
determining a first fluid flow through the lube circuit at the first movement and a second fluid flow at the second movement;
comparing the second fluid flow to the flow threshold; and
triggering a second alert signal to service the transmission if (a) the second fluid flow is equal to or less than the flow threshold and (b) a difference between the first time value and second time value is less than a timing threshold.

* * * * *